United States Patent [19]

Reil et al.

[11] Patent Number: 5,158,786
[45] Date of Patent: Oct. 27, 1992

[54] APPARATUS FOR DEEP DRAWING AN OPEN BOWL

[75] Inventors: Wilhelm Reil, Bensheim; Ulrich Deutschbein, Muhltal; Gerd Knobloch, Griesheim; Udo Liebram, Pfungstadt, all of Fed. Rep. of Germany

[73] Assignee: Tetra Pak Holdings & Finance S.A., Pully, Switzerland

[21] Appl. No.: 660,702

[22] Filed: Feb. 25, 1991

[30] Foreign Application Priority Data

Feb. 26, 1990 [DE] Fed. Rep. of Germany ....... 4005972

[51] Int. Cl.⁵ .................. B29C 51/18; B29C 51/42
[52] U.S. Cl. .................. 425/341; 264/522; 264/545; 425/342.1; 425/388; 425/504; 425/519
[58] Field of Search .................. 425/387.1, 388, 503, 425/504, 508, 518, 519, 340, 341, 342.1; 264/522, 545, 553

[56] References Cited

U.S. PATENT DOCUMENTS 4,381,276 4/1983 Hegler et al. .................. 425/388
4,883,419 11/1989 Queirel .................. 425/388

FOREIGN PATENT DOCUMENTS

1145784 3/1963 Fed. Rep. of Germany .
1256403 12/1967 Fed. Rep. of Germany .
2326524 12/1975 Fed. Rep. of Germany .
2502170 7/1976 Fed. Rep. of Germany .
2600582 7/1977 Fed. Rep. of Germany .
2630041 1/1978 Fed. Rep. of Germany .
61-246038 11/1986 Japan .
63-144033 6/1988 Japan .

Primary Examiner—Jay H. Woo
Assistant Examiner—James P. Mackey
Attorney, Agent, or Firm—Killworth, Gottman, Hagan & Schaeff

[57] ABSTRACT

An apparatus for deep drawing a bowl from a blank of deep-drawable plastic material is provided comprising deep drawing tools, and cooperating jaws including an outside heating jaw and a forward feed heating jaw. The deep drawing tools and cooperating jaws are movable relative to each other to advance a blank of deep-drawable material for preheating, forming, and deep drawing a bowl open at one end therefrom. The outside heating jaw includes at least one outside suction plate to retain the blank, and intermittently moves in a first direction into and out of cooperating relationship with the forward feed heating jaw. The deep drawing tool also intermittently moves parallel to the first direction into and out of cooperating relationship with the forward feed heating jaw. The forward feed heating jaw includes a plurality of main suction plates secured to a heatable carrier to retain and heat the blank as it advances thereon. The forward feed heating jaw is intermittently moved in a second direction perpendicular to the first direction to alternately position different ones of the main suction plates into cooperating relationship with the outside suction plate of the outside heating jaw.

16 Claims, 11 Drawing Sheets

APPARATUS FOR DEEP DRAWING AN OPEN BOWL

BACKGROUND OF THE INVENTION

The invention relates to an apparatus for deep drawing to a bowl which is open at one side from a blank of deep-drawable plastics material comprising deep drawing tools which are movable relative to each other, and co-operating jaws.

Apparatuses of that kind are known. In use of such apparatuses, one open bowl after another is deep drawn in a cyclic procedure from material in web form, removed from the mould and passed on to further processing stations.

However the known deep drawing apparatuses suffer inter alia from two major disadvantages. The first disadvantage is that the material in web form must be stopped for a prolonged period of time for the deep drawing operation because it is not possible for the period of time for completely heating through the deep-drawable plastics material to be less than a minimum time. It is only after the deep-drawable material has been completely heated therethrough that the deep drawing operation can be carried out. That means that the output of such a machine, that is to say the number of finished products per unit of time, is unavoidably subject to an upper limit.

The second disadvantage is that the material in web form is always necessary along a frame-like strip which extends around the deep-drawn bowl, on the one hand, for holding purposes and thus to permit the deep drawing operation to be carried out, but on the other hand, after the finished product has been made, it is generally a nuisance or superfluous and must then be cut off. Admittedly, in modern deep drawing apparatuses, the operating procedure involved has already changed over to stamping out the deep-drawn bowl and leaving the frame-like strip on the web of material and then rolling up the latter and possibly even re-melting it in order to use the material. That operation of stamping out the product from the web of material, rolling up the remaining material and possibly again melting it etc however involve additional and therefore expensive steps in the process.

SUMMARY OF THE INVENTION

The invention is therefore based on the problem of improving an apparatus of the kind set forth in the opening part of this specification in such a way that the machine output is improved in the sense that the discharge of the number of finished products per unit of time is increased and in addition the wastage is reduced and eliminated as far as possible and furthermore the extremely difficult operation of handling the thermoplastic web of material is substantially facilitated by continuous support.

In accordance with the invention, in the apparatus as set forth in the opening part of this specification, that problem is solved in that provided as the co-operating jaw is a lower main suction plate which is secured to a heatable main carrier and which has vacuum and/or pressure means and which is intermittently movable together with the heatable main carrier as a forward feed heating jaw in a direction perpendicularly to the direction of movement of the deep drawing tool by means of a lift device, that fixed at a spacing from the lower main suction plate on the main carrier is at least one further central main suction plate as a forward feed heating jaw, and that arranged beside the deep drawing tool and at a spacing therefrom is an outside heating jaw with outside carrier and outside suction plate, the outside heating jaw being intermittently movable parallel to the direction of movement of the deep drawing tool, in such a way that the outside suction plate and the main suction plate are opposite each other for a period of time.

The attempt has in itself admittedly already been made to make the co-operating jaw heatable, but in accordance with the invention a particular structure is provided as the co-operating jaw, namely the heatable main carrier in which at least two main suction plates are arranged one above the other at a spacing in its direction of movement. An important aspect in that respect is the consideration according to the invention of reducing the period of time during which the deep-drawable plastics material is in contact with the cooperating jaw for heating purposes, for example halving same. If it is assumed for example that 12 seconds are required for completely heating through the blank, in accordance with the invention the period of time can be so reduced by the provision of two heated suction plates that for the blank between the deep drawing tool on the one side and the lower main suction plate on the other side, for producing the heating effect, a time of for example only 6 seconds is sufficient, with the result that every 6 seconds an open bowl can be ejected in a finished deep-drawn condition from the apparatus.

The remaining heating of the blank over a period of for example 6 seconds presupposes a comparatively long preheating step. Means are provided for that purpose in accordance with the invention insofar as a central main suction plate is additionally heatably provided above the lower main suction plate on the main carrier in the abovementioned manner.

In addition, in accordance with the foregoing teaching of the invention the apparatus is so designed and is additionally provided with such means that it provides for receiving the blank from the respective uppermost main suction plate (for example in this case the central suction plate) and then transfer by way of the outside heating jaws on to the respective lowermost main suction plate (for example in this case the lower suction plate).

Therefore, the lower part of the so-called forward feed heating jaw is disposed opposite the deep drawing tool as the co-operating jaw. The structure of the forward feed heating jaw may be for example again as follows: an elongate heatable main carrier carries at least two main suction plates at a spacing from each other and is moved intermittently by means of a lift device in a given direction which can be assumed for example to be a vertical direction. Disposed in opposite relationship thereto are two tools which are not movable in respect of height but which are movable for example in a horizontal direction, namely in the upper region of the outside heating jaws and in the lower region of the deep drawing tool. The outside heating jaw serves not only for additionally heating the blank in the preheating operation but also for transfer of the blank from the upper position in which the outside suction plate operates to a lower position in which the deep drawing tool operates Therefore the apparatus according to the invention operates in such a way that a blank is sucked by vacuum means to the uppermost main suction plate, being in this case for example the central suction plate, in a position in which the forward feed heating jaw is pulled away from the deep drawing tool, in the example considered herein upwardly vertically by one position. Thereafter the forward feed heating jaw therefore carries the blank and begins to heat the blank on one side and to move it into the next lower position In that position the blank now passes into the operative region of the outside heating jaw which now moves under a light pressure towards the forward feed heating jaw so that there is a good transfer of heat between the outside suction plate and the main suction plate which are both heated and thus preheat the blank. In the next condition the vacuum nozzles of the main suction plate are released and at the same time the vacuum means of the outside suction plate are evacuated so that the blank remains joined to the outside heating jaw and can be removed from the forward feed heating jaw by a horizontal movement.

When now the forward feed heating jaw moves back up into its upper position, it can receive a new blank to be preheated and in addition, in the region of its lower main suction plate, it can receive the preheated blank from the outside heating jaw which again moves horizontally towards the forward feed heating jaw. After venting of the outside suction plate and evacuation of the suction means of the lower main suction plate, there are now two blanks on the two main suction plates of the forward feed heating jaw, namely the upper blank which is still cold and the lower blank which is already preheated.

When loaded in that way the forward feed heating jaw now moves vertically again into its lower position in such a manner that the heated blank is arranged between the deep drawing tool and the lower main suction plate and is held in a heated condition by residual heat so that the deep drawing operation can be carried out. The deep drawing tool alone does not serve for the heating operation but for the cooling operation.

The machine output can be multiplied by virtue of an apparatus of that kind of configuration, with a forward feed heating jaw which is movable linearly cyclically.

If it is now found that the preheating effect can be further improved in order to carry out the deep drawing operation in an even better manner and possibly in an even shorter time, it is then further provided in accordance with the invention that the forward feed heating jaw has at least three main suction plates at equal spacings in the direction of its oscillating movement and the outside heating jaw has at least two outside suction plates in the direction of movement of the forward feed heating jaw at the same spacing at which the main suction plates are secured to the main carrier of the forward feed heating jaw. The man skilled in the art will understand that the transmission mechanism between the outside heating jaw on the one hand and the forward feed heating jaw on the other hand remains the same, that is to say, a blank can be applied to or discharged from each main suction plate, depending on the respective control in respect of the vacuum and/or pressure means; and that in addition the provision of two outside suction plates (or possibly even more outside suction plates) means that there is available a preheating time which is double that described above.

In other words, the time required for heating the blank becomes progressively less and less, whereby on the one hand the respective uppermost main suction plate can receive cold blanks at a faster rate and the apparatus on the other hand can eject deep-drawn bowls more quickly at its discharge end.

It is desirable for the respective suction plates which could also be referred to as pressure plates, corresponding to a different control mode, to be of a substantially flat configuration in order to preheat a blank which is also substantially flat, for carrying out the deep drawing operation. It is further desirable if the deep drawing tool comprises, in a frame-like configuration around the open side of the bowl to be produced, a clamping strip which is as narrow as possible and which co-operates with the corresponding edge of the cooperating jaw with the result that the end product, for example the finished bowl which is open at one side, has an only narrow strip in a frame-like shape on its outside. Consequently no material grid constituting wastage has to be separated from the finished bowl from the flat arcuate blank (or in the case of a web which is drawn from a roll), and processed separately for recycling. On the contrary the entire blank is drawn to provide the bowl which is open at one side, without wastage.

It is preferable if in accordance with the invention the outside heating jaw is constructed from an outside carrier to which at least two outside suction plates are secured by way of outside heating bodies, wherein heat insulation is preferably provided between the outside carrier and the respective outside heating body. In the case of the outside heating jaw, the carrier is disposed on the outside on one side, for which reason it is referred to here as the outside carrier. Mounted thereto are heat insulating plates which in turn carry the respective outside heating body so that by virtue of that structure the heating body does not heat up the outside carrier and thus would not heat the surroundings without effect in terms of the production process. On the contrary, due to the heat insulation, the heat generated by the outside heating body is kept away from the outside carrier and is instead passed on the other side to the outside suction plate disposed on the outside heating body. It is only the latter that is to be heated up because the blank to be heated receives its heat through that outside suction plate.

It is particularly desirable in accordance with the invention if, in a further advantageous configuration the main suction plates are secured in pairs on opposite sides of the main carrier, two outside heating jaws with outside carrier and outside suction plates which are towards the forward feed heating jaw are arranged in a corresponding manner, and there are two mutually oppositely disposed deep drawing tools. That structure which is symmetrical relative to a notional vertical plane which is to be envisaged as passing centrally through the heatable main carrier also better explains the above-selected terminology of 'outside heating jaws', more specifically such jaws being arranged on the outside, that is to say on each side of the plane of symmetry with respect to the centrally disposed forward feed heating jaw.

That pair-wise configuration of the forward feed heating jaw in the center on the one hand and the outside heating jaws and deep drawing tools at respective outside positions on the other hand makes it possible to double the machine output because double the number of bowls which are open at one side can be produced with the same movements and thus in the same time. Under a particular condition however, that symmetrical structure also gives a further advantage, namely the possibility of producing a pack which is adapted to be closed on all sides, consisting of two bowls. The above-mentioned condition is that the main body of the blank is shaped out or deep drawn outwardly by means of the deep drawing tool from the central forward feed heating jaw in such a way that the one open surface of the respective bowl is more specifically towards the forward feed heating jaw or its lower main suction plate. In that fashion, after the deep drawing operation, two bowls are disposed in opposite relationship to each other in such a fashion that, in the further horizontal movement and bringing together of the two deep drawing tools of the described pair, the edges of the respective open bowls can be pressed against each other and glued or sealed together, thereby providing a container.

In the apparatus according to the invention therefore the deep drawing tool is movable with a translatory motion intermittently from an outer return position into a central deep drawing position and further to an edge sealing position and then back again. In the first return position the spacing between the deep drawing tool and the forward feed heating jaw is so great that the forward feed heating jaw can move away from the deep drawing tool or move towards it again.

In the second position, that is to say the central deep drawing position, the edge-like clamping region of the deep drawing tool fits sealingly to the lower main suction plate of the forward feed heating jaw so that vacuum can be applied to the deep drawing tools and the blank clamped therebetween can be sucked back into the mould cavity of the deep drawing tool. The spacing between the deep drawing tool on the one hand and the forward feed heating jaw on the other hand is therefore zero in that position.

For the purposes of forming a pack from two open bowls, it will be appreciated that, after the deep drawing operation, the deep drawing tool must be pulled back again by a distance, that is to say, must be moved away from the forward feed heating jaw, so that the latter can move for example upwardly from its deep drawing position (it will be appreciated that the forward feed heating jaw also has a deep drawing position, namely its lowermost position). Due to that last-mentioned movement of the forward feed heating jaw, the space between the deep drawing tools which are arranged in mutually opposite relationship in pairs is now free and the deep drawing tools can then be moved into their third sealing position where both jaws are moved under pressure towards each other and press the frame-like edge of the respective bowl against that of the respective oppositely disposed bowl, utilising the residual heat. In that way the two bowls are glued together, sealed and inseparably joined along their edges. The pack is finished and can be removed from the mould after the return movement of the deep drawing tools.

It may however be desirable to provide a particular opening with particular closure means on such a pack, and steps are also provided for that purpose in accordance with the invention. More specifically it is proposed in that respect that, in accordance with the invention, arranged at an edge of the lower main suction plate is a projection for bulging out the blank while a congruent recess is disposed at the corresponding edge of the lower outside suction plate. The simplest mode of producing and arranging an opening for the subsequent pack is a symmetrical arrangement of an opening, that is to say arranging half an opening at the edge of the respective open bowl in such a way that when two bowls are brought together, the two half-openings go together to form a complete opening. With the apparatus according to the invention, such a procedure is most easily achieved by the respective blank being forced at an edge to lie over a bulge portion. For that purpose, in accordance with the above-mentioned teaching in accordance with the invention, arranged at the respective inwardly or centrally disposed main suction plate is a projection which extends into a corresponding space, that is to say a corresponding recess, on the one hand in the suction plate and on the other hand also the deep drawing tool. Without the blank, when the outside suction plates and the forward feed heating jaw are brought together in the one position and when the deep drawing tools are brought together in the other position, there is a spacing between the respective outward surfaces of the projection on the inside and the respective recess on the outside. That spacing however is in the range of between 1/10th and a few millimeters, preferably from 1 to 3 millimeters, so that it is completely occupied by the blank or the thickness of the plastics material provided for the blank. That even guarantees a gas-tight clamping effect when the clamping portions are brought together.

The above-described projection on the main suction plate and the recess on the outside suction plate already serve for preshaping the opening insofar as the edge region of the blank, which has already been preheated, in the position prior to the deep drawing operation, is shaped by the edge of the blank being laid around the projection.

In an advantageous configuration of the invention, it is particularly desirable if accordingly the cavity of the deep drawing tool is substantially triangular in the cross-section of its plane of movement and the projection on the main suction plate is semicircular in the same cross-sectional plane, wherein the projection and the recess accommodating same is preferably conical in such a way that the cone opens towards the edge of the respective plate.

If, in the position prior to the deep drawing position, we consider the outside suction plate with its recess on the one side and the main suction plate with its projection on the other side, and a section is passed therethrough in the direction of movement of the outside heating jaw, which is in fact parallel to that of the deep drawing tool, then that should give a semicircular section line for each projection and recess. Such a projection could also be semicylindrical. It is additionally stated however that it is preferably semi-conical. If now in terms of operation we consider the next following position, namely the deep drawing position, and thereafter the sealing position in which the forward feed heating jaw is drawn out between the two deep drawing tools, then admittedly the physical projection on the main suction plate is removed, but the material of the blank in that region which had been shaped around that projection is now in the described configuration of a cone with its opening enlarging towards the outer edge.

The further details of the foregoing configuration according to the invention to the effect that the cavity of the deep drawing tool is of a triangular cross-section means in terms of the finished product that the respective bowl is substantially V-shaped in cross-section and is for example rectangular in longitudinal section. If that bowl were to be put on a plane with the surface upwardly, that bowl would come to lie on the edge of the 'V'. If on the other hand two bowls which are open at one are moved edge-to-edge together in the sealing position with the deep drawing tools moving towards each other, then that configuration of the deep drawing tool ultimately means that the finished product, the pack provided with the above-described opening, has a web portion which extends around the pack in a frame-like configuration, namely the two sealed edges, that web portion extending along a diagonal in a plan view on to the pack which is then substantially quadrangular in cross-section. Therefore the plane of separation of the entire pack lies in the planes of the frame-like clamping edges of the bowl which is respectively open at one side, wherein that plane of symmetry extends through the diagonals of the top and the bottom.

With the shaping of the deep drawing tool being of the above-described configuration, each bowl which is open at one side has two side walls which are disposed in a V-shape relative to each other (like the two surfaces of a pitch roof) and two substantially triangular end walls (like the gables of the roof) which are quadrangular in plan view when two bowls are brought together to provide the pack. The one quadrangular end surface then forms the bottom while the other end surface forms the top of the pack.

The projections and recesses on the lower main suction plate and in the outside suction plate respectively are preferably disposed in the region of the above-mentioned end surfaces so that ultimately the one semicircular opening lies in the one end wall of the open bowl with the result that, when the two bowls are welded together, the circular opening is arranged in an end wall which subsequently forms the top of the pack.

It is also advantageous in accordance with the invention if disposed at the underside of the main carrier is an opening mould portion, preferably with a projection which projects into the interior of the deep drawing too. The projection with the recess in the heating position before the deep drawing position therefore essentially provides for preshaping of the subsequent opening and the final shaping operation can be carried out in a particularly satisfactory manner when the opening mould portion is secured to the main carrier and in the deep drawing position extends into the interior of the deep drawing tools which are then in a condition of having been moved towards each other. On the one hand, the opening mould or shaping portion which preferably has a projection provides a gas-tight sealing effect while on the other hand the opening mould portion can provide an accurate configuration for the edge region with the part-opening provided therein. In that way it is possible to provide an exact opening means on a pack.

In accordance with the invention it is also desirable if furthermore the forward feed heating jaw and the outside heating jaw are substantially in the form of a rectangular plate, a plurality of deep drawing tools are secured to each other, extending over the length of the rectangular plate, and corresponding to the number thereof a plurality of projections and recesses are provided in the suction plates. It will be appreciated that a corresponding number of opening mould portions is also disposed at the respective undersides of the single main carrier. More specifically, in that way it is possible simultaneously to form a plurality of bowls which are open at one side from a flat blank of suitable size, those bowls each being connected together only by narrow web portions. Even if the abovedescribed process is carried out with the apparatus according to the invention and the plurality of half-bowls on one side of the forward feed heating jaw are joined and sealed together with the plurality of half-bowls which have been fully deep-drawn on the other side of that jaw, that simultaneously provides a plurality of and for example four six, ten or more packs with the described openings which initially all are still attached together and which can accordingly be for example filled and closed in an advantageous mode of operation. The packs can then be separated from each other by one pack being separated from another or by a pair of bowls being separated from another pair of bowls by cutting along the web portions connecting the plurality of packs/bowls, preferably by thermal severing.

If therefore 12 seconds are required to heat a plastics blank completely throughout its entire volume for the deep drawing operation, then, in an apparatus with a deep drawing position, a central position and an upper position, in each thereof there is available a time for 4 seconds, including the movement of the individual jaws, for shaping a finished half-bowl from the cold blank and possibly even shaping a pack. That considerably increases the level of output and a bowl or packs can be produced without wastage.

Further advantages, features and possible uses of the present invention are apparent from the following description with reference to the accompanying drawings in which:

DETAILED DESCRIPTION OF THE PREFERRED EMBODIMENTS

Figure 1:
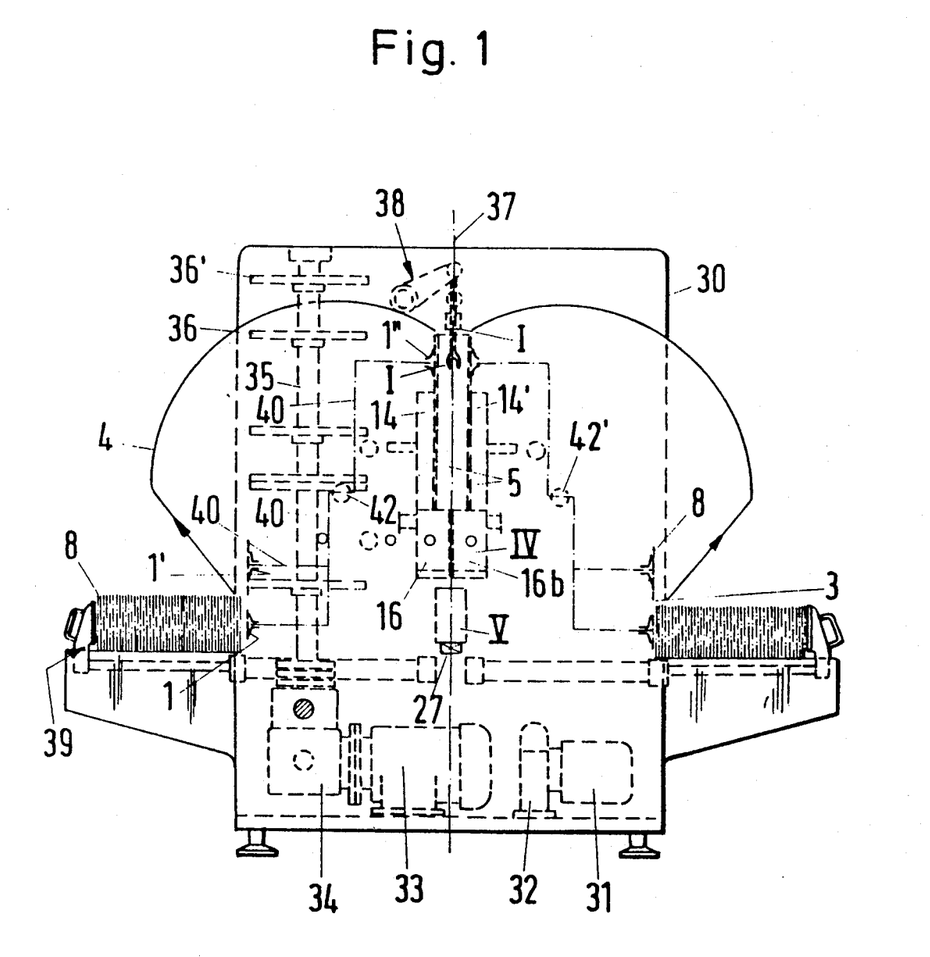
FIG. 1 is a diagrammatic front view of an apparatus for producing two bowls and joining same to form packs when viewing in the direction of the plane of symmetry and in opposite relationship to the direction in which the finished row of packs is conveyed away.
Figure 2:
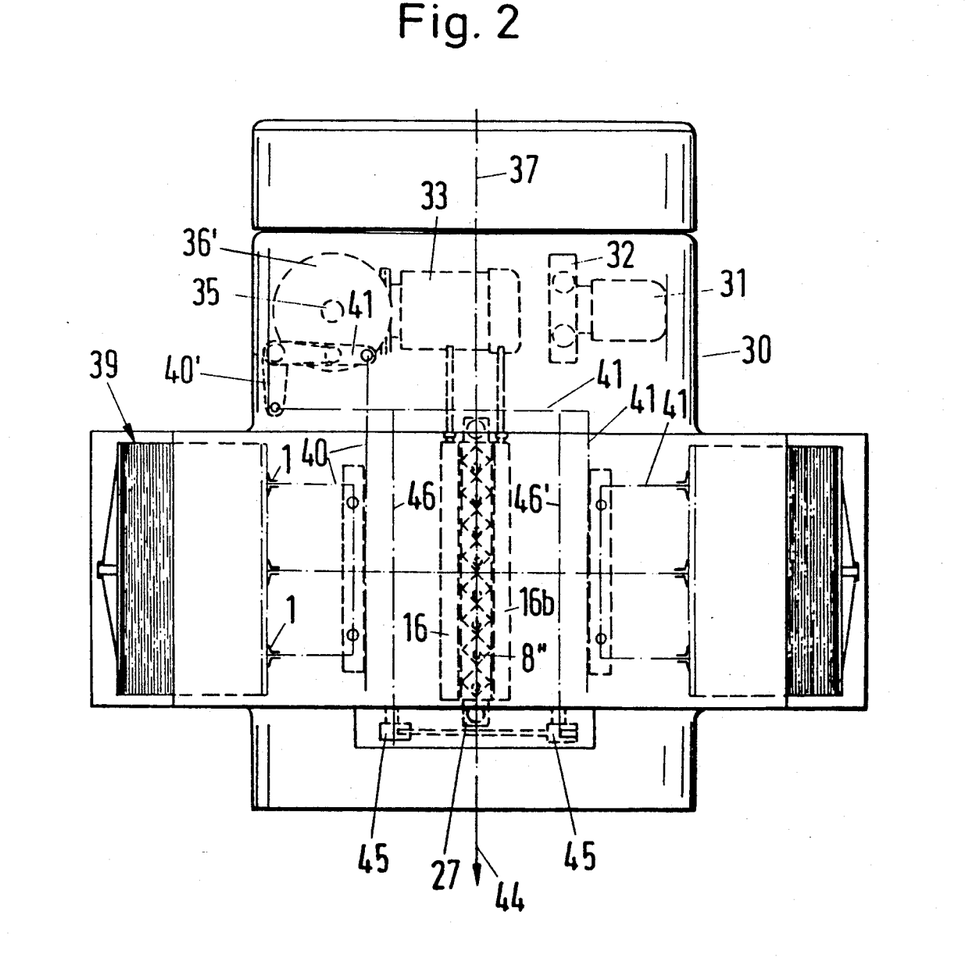
FIG. 2 is a view of the FIG. 1 machine from above, with the main plane of symmetry again being viewed vertically downwardly at the center of the sheet of drawing.

Referring to FIGS. 1 and 2, shown therein is the deep drawing apparatus only with its essential parts within a housing which is generally identified by reference numeral 30. Except for the vacuum fan 31 with the discharge housing 32, the electrical drive motor 33 with direction-changing transmission 34, arranged beside the fan 31 in the lower region of the machine, and the vertical cam shaft 35 with the various control cams 36, 36' and finally the lift device 38, the apparatus is of substantially symmetrical configuration relative to the general plane of symmetry 37. The plane of symmetry is indicated in FIG. 1 by the vertical line identified by reference numeral 37. The plane of symmetry 37 is also to be found in FIGS. 2 to 9. To describe the apparatus shown herein it is therefore sufficient to describe the parts of the machine in one half thereof, that is to say on for example the left-hand side of the plane of symmetry 37 represented by the vertical line.

An entire stack of blanks 8 is arranged in a magazine 39, in the form of flat rectangular plates of deep-drawable plastics material. Not shown are support levers with suckers 1, the movement of which over the dash-dotted line 40 on the left-hand side of the plane of symmetry 37 and the dash-dotted line 41 on the right-hand side of the plane of symmetry 37 is derived from the respective control cam 36' by way of the mechanical/pneumatic arms 40', 41'. The suckers 1 are displaced substantially by a rotary movement about the point 42, 42' but additionally also with a translatory movement, from the lower position shown in FIG. 1, after sucking up a blank 8, into their upper position 1' in which for example the lower edge is identified by reference numeral 3, as viewed from the side in FIG. 1. From that intermediate position 1' the suckers together with the blank 8 held thereby are so moved into the upper position I that the lower edge 3 of the blank 8 passes along the curve identified by reference numeral 4 in FIG. 1. In position I the suckers 1" are disposed opposite what is referred to as the upper main suction plate 7 of the forward feed heating jaw which is generally identified by reference numeral 5. In that position I, on each side of the plane of symmetry 37, the respective blank 8 is sucked on to or applied against the upper main suction plate 7 by releasing the suckers 1" and evacuating the vacuum means (not shown) on the upper main suction plate 7. The suckers 1" then move back into the position of the sucker 1 in order to suck on the next blank 8 for example after 4 seconds and to transfer it to the upper main suction plate 7 again in the above-described manner.

During that transfer movement of the blank 8, the vertical cam shaft 35 moves and by way of its control cams 36 etc produces other movements as will be described with reference to FIGS. 3 to 9. Disposed beneath the pair of forward feed heating jaws 5 is the pair of deep drawing tools 16 (on the left-hand side of the plane of symmetry 37 described herein) and 16b on the opposite right-hand side. The level of the deep drawing tools 16, 16b is at the same time also the position IV. It will be seen from FIG. 1 that the movement of the blanks 8 being processed is vertically downwardly along the plane of symmetry 37, that is to say from the lift device 38 towards the deep drawing tools 16, 16b and further downwardly into position V and on to the conveyor belt 27.

In FIG. 2 the lift device 38 and the forward feed heating jaws 5 have been omitted so as to show the deep drawing tools 16, 16b which have been moved away from each other and the interposed row of 8 finished packs 8' which are disposed on the conveyor belt 27 and which are being conveyed away as indicated by the arrow 44 in the direction of the line representing the plane of symmetry 37.

Further cam follower arms corresponding to the levers 40' provide for actuation and movement of a pair of motion levers 45 along the diagrammatic control line 46, 46' in order to produce the movements of the individual parts of the apparatus, which are now shown with reference to FIGS. 3 to 9.

A bowl 8b which is open at one side is to be formed from the blank 8 by way of various intermediate stages; on each side of the plane of symmetry 37 a deep drawing tool 16 and 16b respectively is movable in the direction indicated by the double-headed arrow 20 towards and away from a co-operating jaw which is the forward feed heating jaw 5 described herein.

The forward feed heating jaw 5 is so structured in each half that in the center it carries a heatable main carrier 6, that is, a main carrier 6 having means for heating, and three main suction plates which are each arranged at the same defined interval or spacing (a) from each other. More specifically here there are an upper main suction plate 7, a central main suction plate 7a and a lower main suction plate 7b. The main carrier 6 extends integrally over all three suction plates 7, 7a, 7b.

Figure 11:
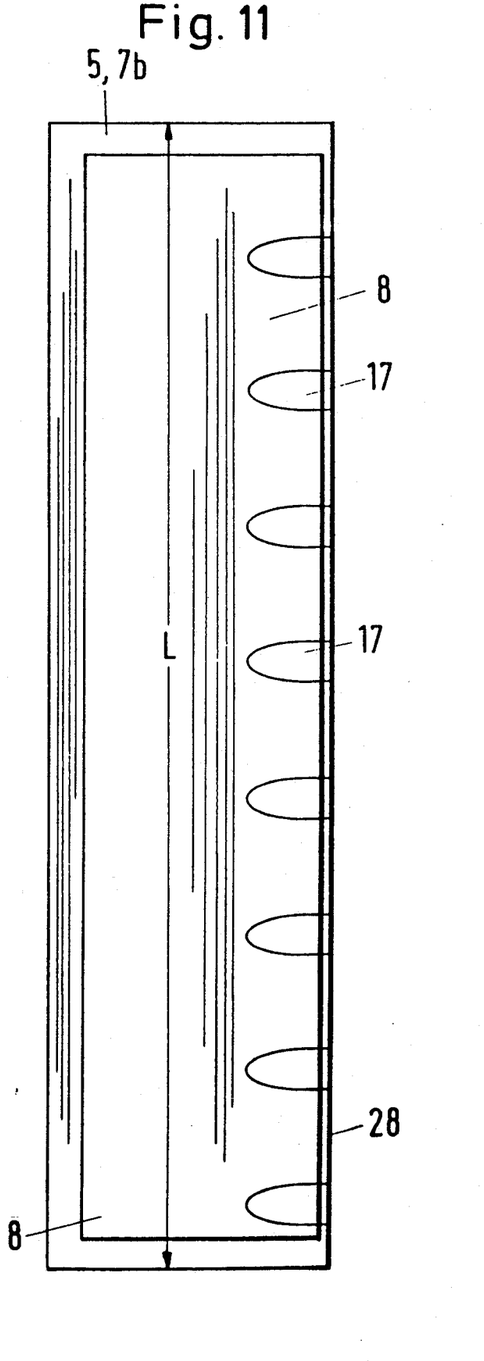
FIG. 11 is a side view of the lower main suction plate when viewing from left to right in FIG. 10.

The overall length L of the forward feed heating jaw 5 which is clearly shown in FIG. 11 is about 1 meter. That length extends in the direction of the conveyor belt 27, that is to say perpendicularly to the plane of the paper in FIG. 1, and is also perpendicular to the plane of the paper in FIGS. 3 to 9; in contrast it is disposed in the direction of the movement arrow 44, in the plane of the paper in FIG. 2. Therefore the length L of the deep drawing tool 16, 16b is also about 1 meter. In regard to length, the same also applies in relation to the outside heating jaws which are generally identified by reference numeral 14 and which are to be seen in FIGS. 1 and 3 to 9.

The forward feed heating jaw 5 is movable in the direction indicated by the double-headed arrow 21, also referred to as the second direction of movement, perpendicularly to the direction of movement indicated by the double-headed arrow 20, also referred to as the first direction of movement. The deep drawing tool 16 (and in a corresponding fashion its oppositely disposed jaw 16b) and the outside heating jaw 14 are movable in the direction of the double-headed arrow 20. The direction of movement is the same, the path of movement of the outside heating jaw 14 being parallel to that of the deep drawing tool 16.

In regard to the structure of the formed feed heating jaw 5, it should also be mentioned that disposed at its lower end which is towards the deep drawing tool 16 is an opening mould or shaping portion 24 comprising a rail or bar 24a which extends over the length L of the forward feed heating jaw 5 and which has vent openings 24b, and a corresponding plurality of opening mould projections 25, the machine in FIG. 2 with the eight successively disposed pairs of jaws therefore also having eight projections 25 on the single continuous rail or bar 24a. The individual main suction plates 7, 7a, 7b are arranged integrally or separately over the length L of the forward feed heating jaw 5 or the main carrier 6, and the lower main suction plates 7b each have part-conical projections 17 at their upper edge 46. It will be seen from FIGS. 9a and 9b that a projection 17 is formed or disposed both on the left-hand side of the plane of symmetry 37 (FIG. 9a) and also on the right-hand side (FIG. 9b) of each respective lower main suction plate 7b and thus also at the upper edge 46 thereof. As each bowl or pack 8" needs only one depression in the edge or opening, there are as many projections 17 as there are projections 25, also being distributed in the same positions over the length L of the forward feed heating jaw 5. In the example of the machine shown in FIG. 2, with eight packs 8" which can be produced simultaneously, there are therefore eight projections 17 arranged on each of the lower main suction plates 7b which are disposed in pairs. Correspondingly, eight deep drawing tools 16 are provided and connected to each other in series to form the eight packs 8" shown in FIG. 2. (See also FIG. 12.)

Figure 3:
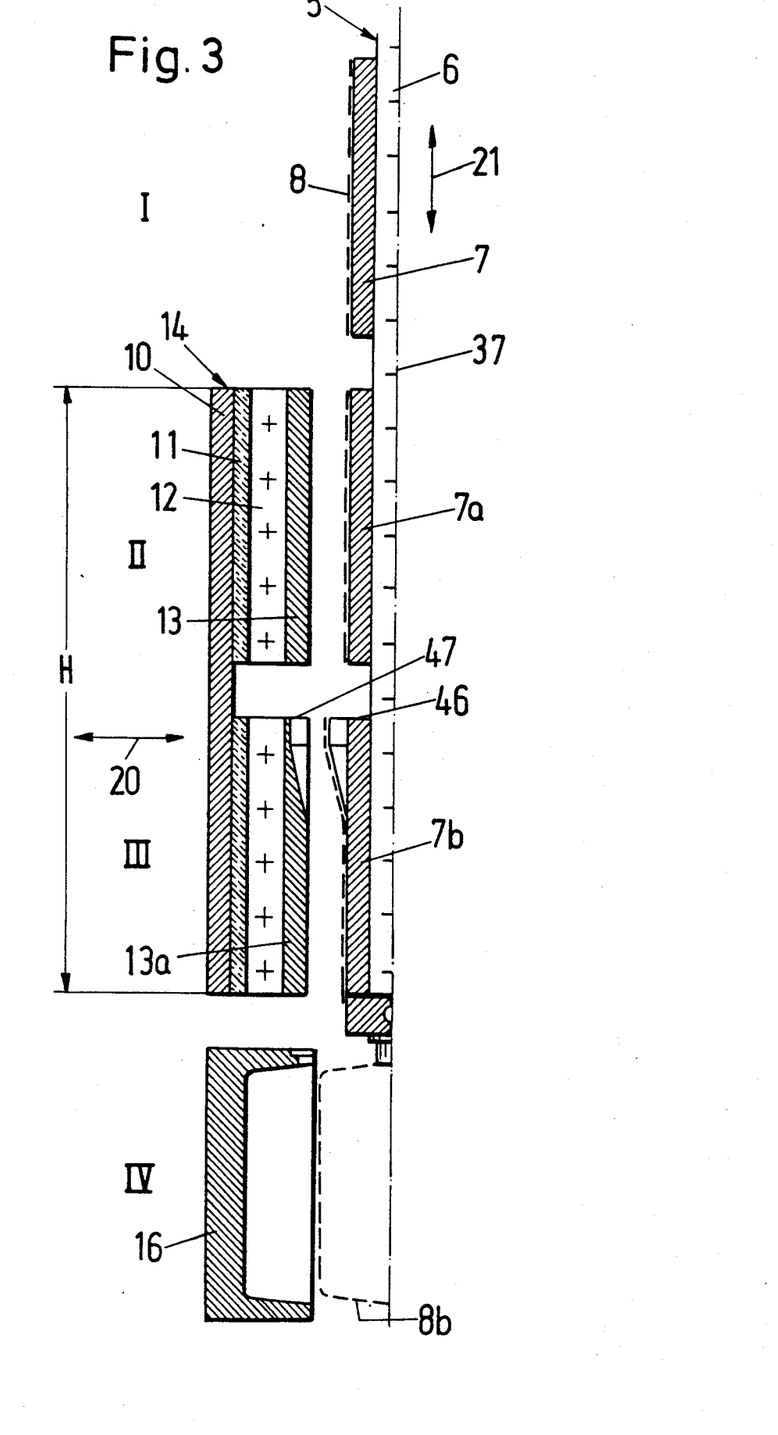
FIG. 3 is a diagrammatic view individually illustrating the main processing parts of the apparatus with formed feed, outside and deep drawing tool in a first operating position.
Figure 9A:
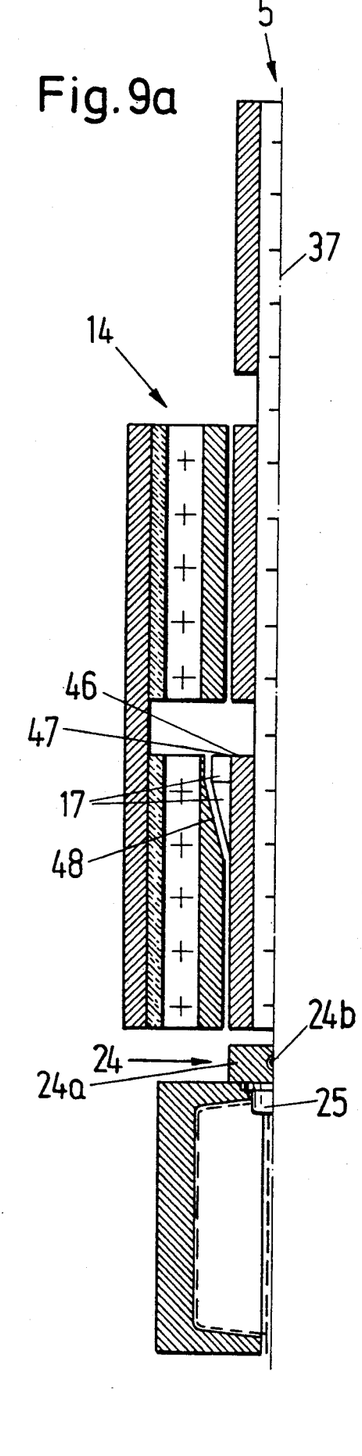
FIGS. 9a and 9b show a further operating position (after that shown in FIG. 8), wherein all jaws are shown diagrammatically arranged in pairs on both sides of the plane of symmetry.
Figure 9B:
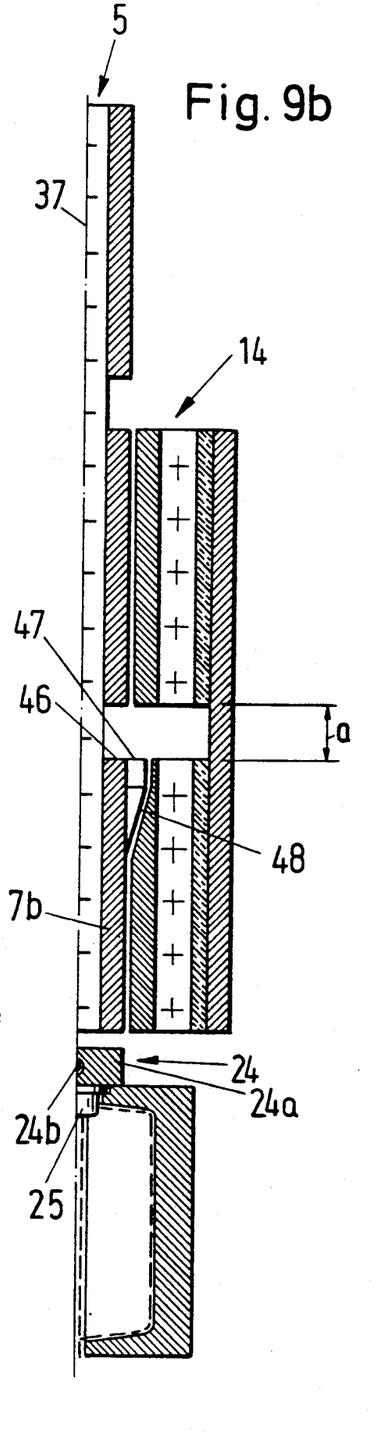
Figure 10:
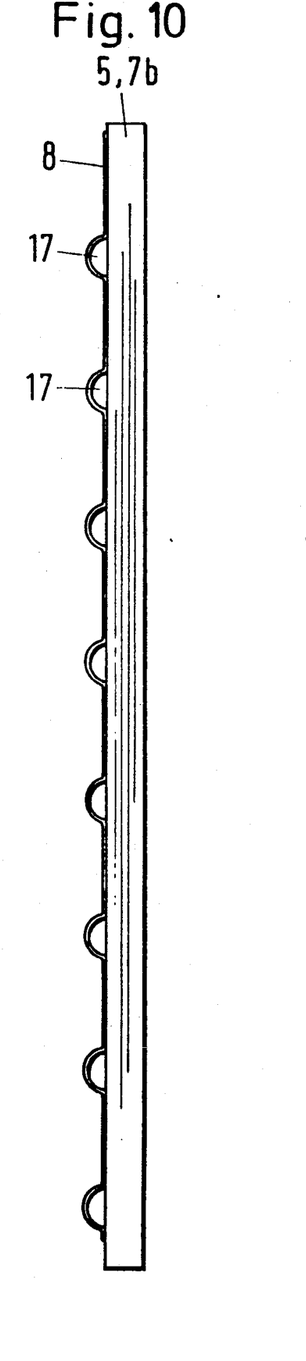
FIG. 10 is a plan view of the lower main suction plate along line X—X in FIG. 4.

The structure of the outside heating jaw 14 is symmetrical, as shown in FIGS. 9a and 9b, so that it is sufficient to describe the left-hand side as shown in FIG. 3. On the side remote from the forward feed heating jaw 5, the outside heating jaw 14 has an outside carrier 10 which extends over its entire height; disposed thereon, on the side towards the forward feed heating jaw 5 is a heat insulation 11 while disposed in turn thereon, towards the jaw 5, is a means for heating, also referred to as an outside heating body 12. Once again, disposed on the latter, on the side towards the heating jaw 5, is an outside suction plate 13.

The outside heating jaw 14 also comprises arranged at a spacing over its height H (see FIG. 3) two groups of outside suction plates 13. The outside suction plates 13 also extend over the length L, the same as the main suction plates 7, 7a, 7b. (See FIG. 11.) The two groups of outside suction plates 13 are, at any height H, continuous or separate suction plates 13. The outside suction plates and main suction plates are preferably substantially rectangular in shape. The arrangement of the outside suction plates 13 on the one hand and the main suction plates 7, 7a, 7b on the other hand is substantially such that in the respective operating positions II and III the outside suction plate and the main suction plate are disposed opposite each other substantially over the same height and the same length so that they can be urged towards each other under pressure and it is possible to provide for a good transfer of heat to the blank 8 which is clamped in position therebetween.

If the direction of movement 21 of the forward feed heating jaw is considered to be vertical and the direction of movement 20 of the outside heating jaws 14 on the one hand and the deep drawing tools 16, 16b on the other hand is considered to be horizontal, then a lower outside suction plate 13a is disposed at the spacing (a) from the upper outside suction plate 13 of the outside heating jaw 14. If, when looking at FIGS. 3 to 9, reference is made herein to 'a$_n$'outside suction plate 13 or 13a, then consideration is being given here in each case to only one of the eight successively disposed operating stations which are visible in FIG. 2. The man skilled in the art will already appreciate from the foregoing description that each outside heating jaw 14 comprises, integrally or separately, eight upper and eight lower outside suction plates 13 and 13a respectively.

As shown in FIG. 9a receive the projection 17 on the main suction plate 7b at the corresponding upper edge 47, the lower outside suction plate 113a has a congruent recess 48 which, like the projection 17 is also cylindrical in the upper region and conical in the lower region. As shown in FIGS. 9a to 11, the cylindrical upper region and the conical lower region of the projection 17 and recess 48 are semicircular in cross-section.

The deep drawing tool 16 is shown in FIGS. 3 to 9 in a section through the opening means 50 on a sectional plane which also contains direction of movement of the deep drawing tool 16 as indicated by the double-headed arrow 20; that is to say, perpendicularly to the plane of symmetry 37, although in the view shown in FIGS. 3 to 9 the plane of symmetry 37 is perpendicular to the plane of the paper and the sectional plane through the deep drawing tool 16 lies in the plane of the paper.

In that sectional view the inner cavity 49 of the deep drawing tool 16 is substantially rectangular and goes through the opening 50. If a cross-sectional view is produced perpendicularly thereto, that is to say parallel to a plane corresponding to the plane of the paper in FIG. 2 (parallel to the top and the bottom of the subsequent pack), then that cavity 49 which then again lies in the plane of movement as indicated at 20 of the deep drawing tool 16 is substantially triangular with preferably rounded-off corners. In that case therefore a bowl 8b which is deep-drawn into that cavity 49 would be of the shape shown in FIG. 12 (in which the row of eight bowls 8a is again shown). It will be seen that there is an isosceles triangle whose hypotenuse lies against the forward feed heating jaw 5 or the main suction plate 7b and passes around the projection 17 on that lower main suction plate 7b.

The mode of operation of the apparatus is as follows:

The way in which the blank is lifted with the suckers 1 into the position of the suckers 1' and then moved upwardly into position I with the suckers I" along the path of movement 4 of the lower edge 3 of the blank 8 had been described above.

That position I is also shown in FIG. 3 in which the blank 8 is shown in the position of being sucked to the upper main suction plate 7, in dash-dotted line. The entire forward feed heating jaw 5 is disposed in the position of being displaced upwardly, as indicated by the double-headed arrow 21 (the forward feed heating jaw 5 can only ever be displaced by one position into the illustrated upper position or the lower position shown in FIGS. 4 to 6).

Shown at the spacing a from the position I and below same are the position II, at a further spacing a beneath same is the position III and below same at a further spacing a is the position IV.

In position IV therefore the deep drawing tool 16 reciprocates with a translatory movement as indicated by the arrow 20 and in addition the external heating jaw 14 can also be reciprocated in the direction indicated by the double-headed arrow 20, being nondisplaceable in respect of height. On the other hand the formed feed heating jaw 5 can only be moved upwardly or downwardly as indicated by the arrow 21.

Figure 4:
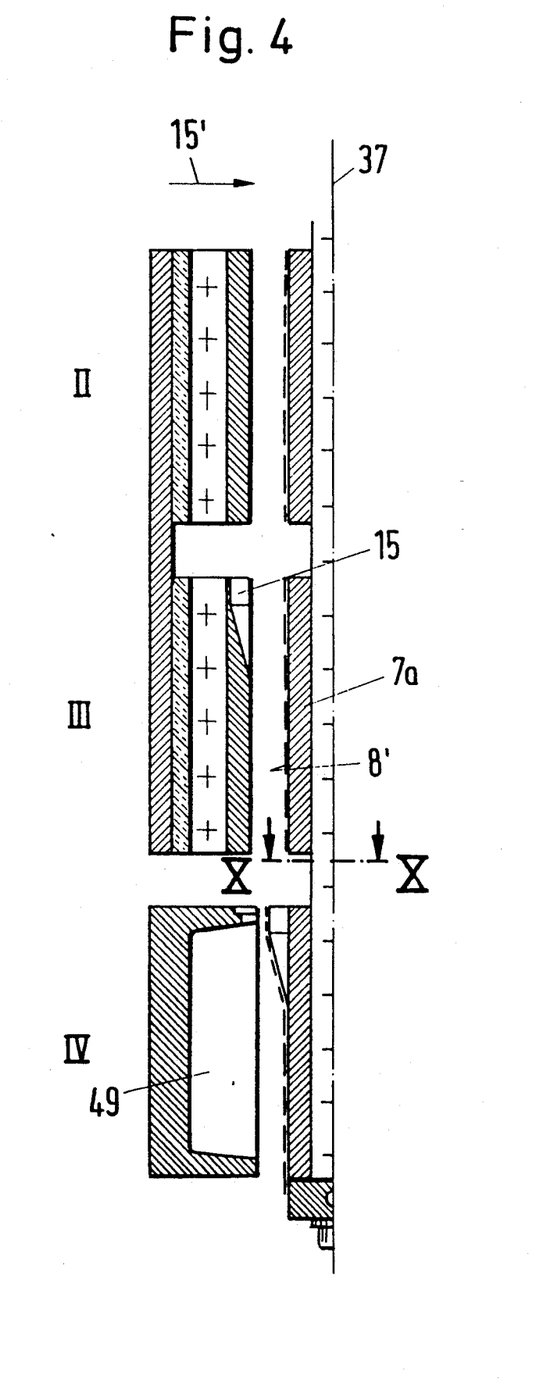
FIG. 4 to 8 show the same parts of the apparatus as those shown in FIG. 3 in respectively different and successive operating positions, wherein FIGS. 3 to 8 each show only the jaws which, in the direction of view in FIG. 1, are disposed to the left of the plane of symmetry shown in the form of a vertical line.

Next the forward feed heating jaw 5 is moved into its lower position as shown in FIG. 4, as indicated by the downwardly directed arrow 21, accompanied by the blank 8. The blank 8 is now in position II, FIG. 4. As the main carrier 6 is heated, the blank 8 now begins to heat up. The heating jaws 14 or the outside suction plate 13 which is directly opposite the blank 8 are now arranged on the outside in position II. The outside heating jaw 14 now moves into the closing position as indicated by the arrow 15' (which is the right-hand half of the motion arrow 20) so that the blank has reached position II in FIG. 5. The outside heating jaw 14 applies a small pressure to provide for good transfer of heat from the outside heating body 12 to the outside suction plate 13 and therewith also to the blank 8. In position II, FIG. 5, therefore heat passes on the one hand from the outside heating jaw 14 and on the other hand from the forward feed heating jaw with suction plate 7 directly to the blank. The plates are disposed in opposite relationship with that pressure contact condition for 4 seconds in the individual positions, that is to say also in position II.

Figure 6:
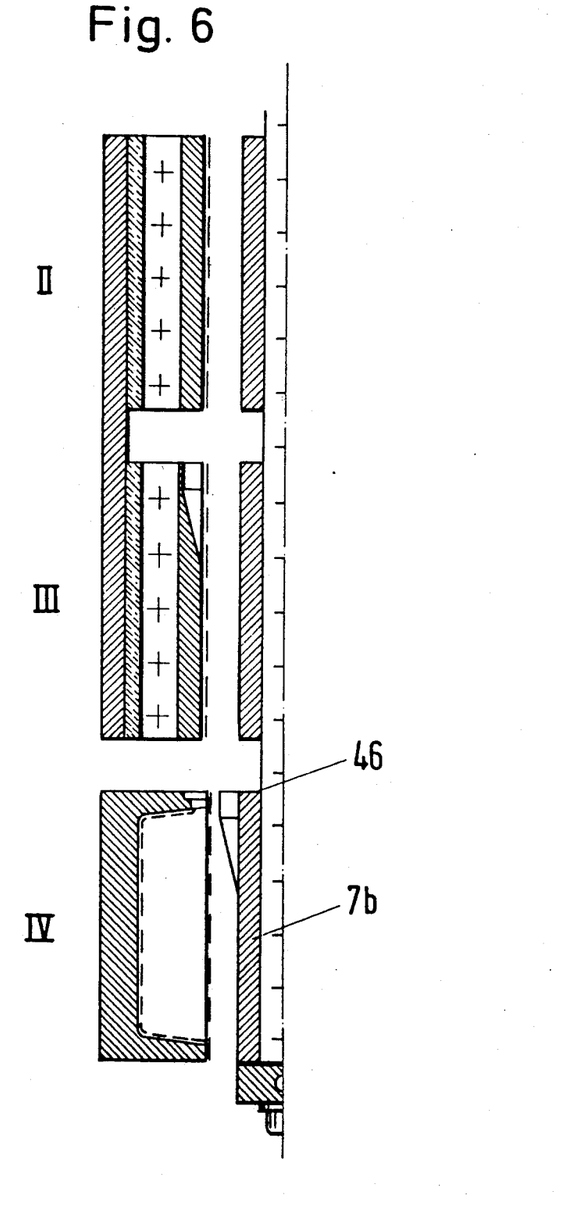
Figure 7:
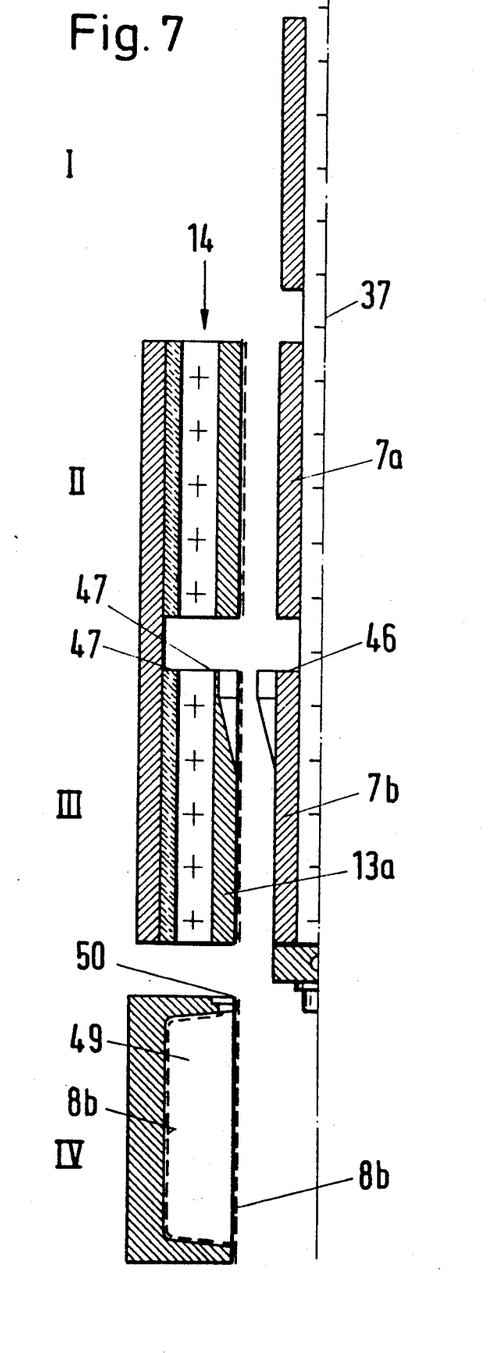
Figure 8:
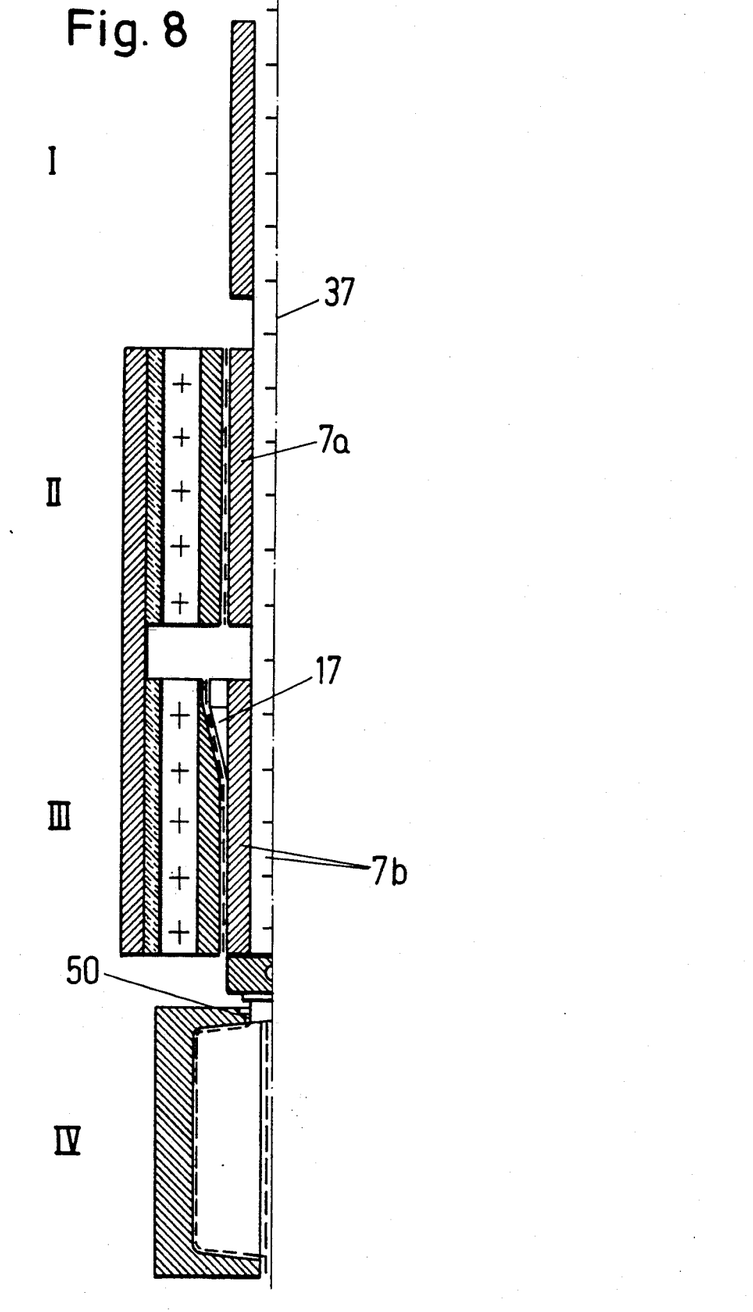

The blank 8 is now transferred into position II, FIG. 6, by the vacuum nozzles (not shown) of the upper main carrier plate 7 being released while vacuum is applied to the suction means (also not shown) in the outside suction plate 13. As a result the blank 8 remains attached to the outside heating jaw 14 (position shown in FIG. 6). The forward feed heating jaw 5 now moves into its uppermost position, FIG. 7, that is, it moves one position upward again in the direction indicated by the arrow 21. At the top it takes over a fresh blank 8 and at the bottom, where in FIG. 7 the central main suction plate 7a is empty, the preheated blank 8 is now received by the oppositely disposed outside suction plate 13 (in the above-described manner by releasing and evacuating the vacuum means). Apart from the blank which is freshly picked up at the top, on the upper main suction plate 7, which blank is not further illustrated, position II in FIG. 8 is reached after the outside and forward feed heating jaws are further brought together, as indicated by the arrow 15'. Preheated blank 8 is now received by the oppositely disposed central main suction plate 7a (in the above-described manner by releasing and evacuating the vacuum means).

The forward feed heating jaw 5 now moves downwardly by one position again as shown by the arrow 21, thus reaching a condition as shown in FIG. 4 at position III. The blank now still bears against the smooth central main suction plate 7a but is opposite the lower outside suction plate 13a with the recess 15 which corresponds to the configuration of the projection 17. Here, in the state of the blank 8', there has already been a preheating effect which has progressed to such a degree that the blank 8' can experience a small amount of expansion. That is necessary because the above-described opening 50 must be produced, otherwise it would not be possible to provide for gas-tight fitting at that location in the deep drawing operation.

Figure 5:
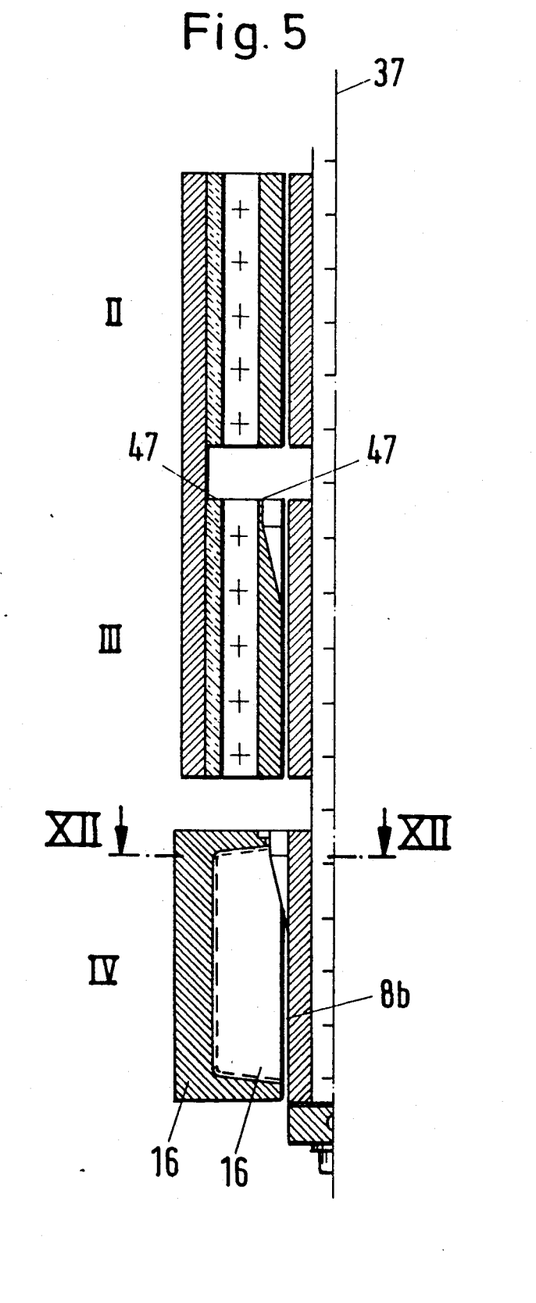

From position III in FIG. 4 the heating jaws move together as indicated by the arrow 15' and come into position III in FIG. 5. The usual suction change now takes place: vacuum is released on the side of the forward feed heating jaw 5 so that the arrangement can move into position III in FIG. 6 in which the two jaws 5 and 14 are separated again. The forward feed heating jaw 5 can now be moved upwardly again in order to reach position III, FIG. 7. The blank 8 to be heated is still flat. When now however the heating jaws 14 and 5 move together again in the direction indicated by the arrow 15' and the condition of position III, FIG. 8 is reached, then the edge of the blank 8 is deformed adjacent its upper edge about the frustoconical portion 17 for due to the upward movement of the forward feed heating jaw 5 from III, FIG. 6 into III FIG. 7, the lower main suction plate 7b has been disposed opposite the lower outside suction plate 13a. Preheated, deformed blank 8 is now also received by the oppositely disposed lower main suction plate 7b (in the abovedescribed manner by releasing and evacuating the vacuum means).

Figure 12:
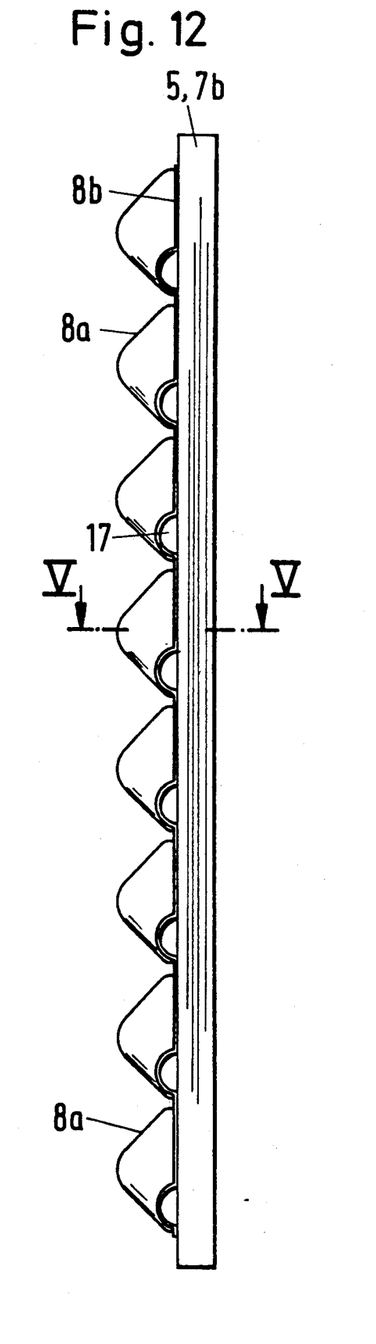
FIG. 12 is a similar view of the lower main suction plate but after the deep drawing operation on line XII—XII in FIG. 5.
Figure 13:
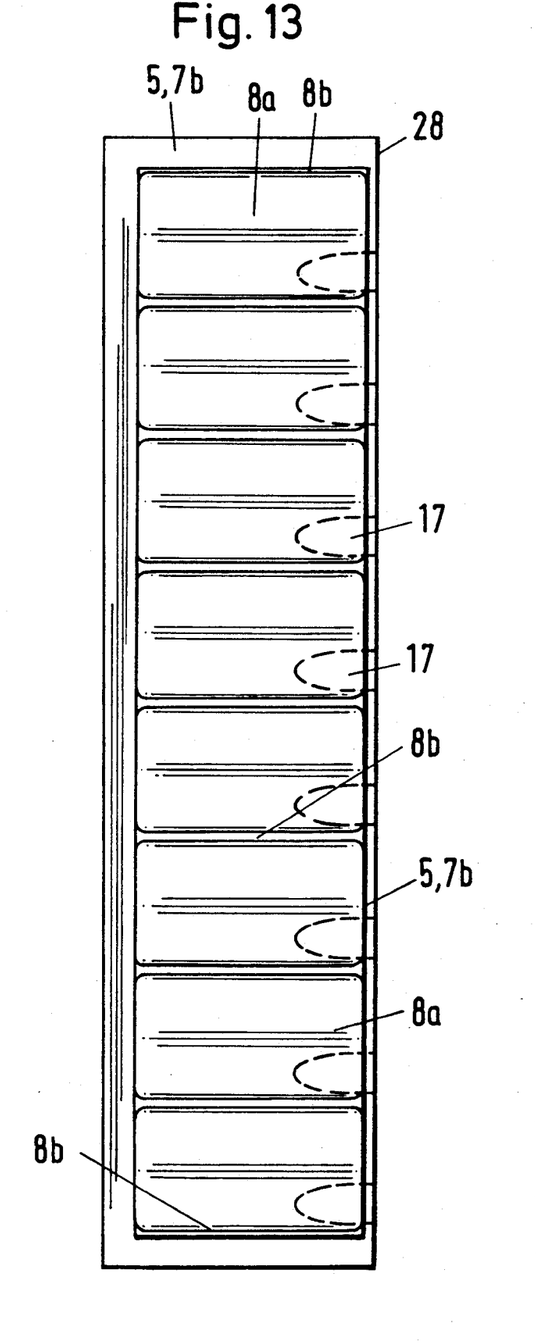
FIG. 13 is a view of the lower main suction plate after removal of the deep drawing tool thereon, when viewing from left to right in FIG. 12.

When now the outside heating jaw 14 opens again towards the left, position III in FIG. 3 is then reached. From there the forward feed heating jaw 5 moves downwardly so that the blank 8 reaches position IV in FIG. 4. The deep drawing tool 16 is at the bottom in all Figures for it is not movable vertically in respect of height but only horizontal with a translatory movement in the direction indicated by the arrow 20. The deep drawing tool 16 then approaches the forward feed heating jaw 5 towards the right and passes into clamping position IV in FIG. 5. The position of the lower main suction plate 7b with the numerous projections 17 can be seen by reference to FIGS. 10 and 11. In the clamping position, as a result of the above-mentioned deformation about the projection 17, a gastight clamping condition is attained. Vacuum can now be applied to the deep drawing tool 16 so that the heated blank 8 moves into position IV in FIG. 5. That is shown in FIG. 12, in another view.

After the deep drawing operation in position IV in FIG. 5, the bowl is now removed form the deep drawing mould by the deep drawing tool 16 being moved towards the left away from the forward feed heating jaw 5 again and thus reaching position IV in FIG. 6. Thereafter the forward feed heating jaw 5 can move upwardly again and reach the position shown in FIG. 7.

When producing a pack from two bowls, the right-hand deep drawing tool 16b now moves into the center and on the plane of symmetry 37 and the left-hand jaw 16 moves towards the right to the same plane 37 so that they close as shown in positions IV in FIGS. 8 and 9 (at the same time the next blank 8 is being processed again in the next higher positions).

After the edge strips of the two half-bowls have been welded together, with the opening being formed therein by means of projections 25, the pack is finished and can be removed from the moulding equipment. For that purpose the two deep drawing tools 16 and 16b move away from each other towards the left and right respectively and air flowing out of the compressed air conduit 24b presses the finished pack off the opening mould portion 24 and conveys it into the position shown at position V in FIG. 1, on to the conveyor belt 27. FIG. 2 now shows how the row of finished packs is disposed on the conveyor belt and can be conveyed away in the direction indicated by the arrow 44.

With the plate structure and contact heating procedure according to the invention it is easily possible in the deep drawing operation to produce the desired and frequently necessary distribution of heat. In the case of a flat plate-like blank, that gives a given pattern of heating. That is intended in particular to provide for uniform wall thicknesses in the deep-drawn component, that is to say the final product.

The deep-drawing plastics material for the new pack which can be produced with the apparatus according to the invention can be a thermoplastic material, for example polypropene. PVC can also serve as such a plastics material, in which connection polypropene is extensively also known in the art as polypropylene. The pack according to the invention then comprises satisfactorily reprocessable and easily degradable parts and materials (in contrast to composite materials—paper/plastics material). In a particularly preferred embodiment the plastics material, for example polypropene, can also be filled, in which respect chalk, mica, talc, gypsum or the like is to be considered in this connection as filler materials. In practice degrees of filling of up to 70% and preferably 60% have proven to be advantageous. It has been found that filled plastics materials of that kind are easily degradable on the one hand, and naturally can also be readily reprocessed or recycled using simple methods, while on the other hand they do not adversely affect the properties of a plastics material so that such filled plastics materials are in particular suitable for deep drawing and can also be sealed.

What is claimed is:

1. An apparatus for deep drawing a bowl which is open at one side from a blank of a deep-drawable plastic, said apparatus comprising:
   a deep drawing tool;
   a cooperating forward feed heating jaw comprising:
      a main carrier including means for heating;
      a plurality of main suction plates secured to said main carrier, said plurality of main suction plates including:
         a lower main suction plate; and
         a central main suction plate spaced a defined interval from said lower main suction plate;
      each of said plurality of main suction plates including vacuum means for releasably securing a blank of deep drawable plastic;
   an outside heating jaw in generally opposing relationship to said forward feed heating jaw, comprising:
      an outside carrier adjacent to said deep drawing tool;
      at least one outside suction plate secured to said outside carrier, said at least one outside suction plate including a lower outside suction plate separated from said deep drawing tool by a space; and
      said at least one outside suction plate including vacuum means for releasably securing a blank of deep drawable plastic; and
   wherein said deep drawing tool, said outside heating jaw, and said forward feed heating jaw are movable relative to each other;
      said outside heating jaw intermittently movable in a first direction of movement into and out of cooperation with said forward feed heating jaw;
      said deep drawing tool intermittently movable parallel to said first direction into and out of cooperation with said forward feed heating jaw; and
      said forward feed heating jaw intermittently movable in a second direction of movement generally perpendicular to said first direction to alternately position said central main suction plate and said lower main suction plate in opposing relationship with said lower outside suction plate.

2. The apparatus of claim 1 wherein:
   said forward feed heating jaw comprises at least three main suction plates secured to said main carrier and equally spaced thereon in said second direction; and
   said outside heating jaw comprises at least two outside suction plates secured to said outside carrier and equally spaced thereon in said second direction at said defined interval.

3. The apparatus of claim 1 wherein said outside heating jaw comprises at least two outside suction plates secured to said outside carrier and equally spaced thereon in said second direction at said defined interval.

4. The apparatus of claim 3 wherein:
   pairs of said plurality of main suction plates are secured on opposite sides of said main carrier; and
   said apparatus further includes two outside heating jaws in generally opposing relationship to said opposite sides of said main carrier of said forward feed heating jaw.

5. The apparatus of claim 1 wherein:
   said lower main suction plate includes at least one projection positioned at an edge thereof for bulging out a blank; and
   said lower outside suction plate includes at least one congruent recess disposed therein;
   whereby said at least one projection and said at least one congruent recess intermittently cooperate to bulge out a blank.

6. The apparatus of claim 5 wherein said at least one projection and said at least one congruent recess each includes a generally semicircular segment and a generally conical segment of semi-circular cross-section.

7. The apparatus of claim 1 wherein:
   said deep drawing tool includes a cavity; and
   said forward feed heating jaw further comprises an opening mold portion disposed at the end of said main carrier nearest said lower main suction plate, said opening mold portion having an opening mold projection which projects into said cavity of said deep drawing tool when said deep drawing tool moves in said first direction into cooperation with said forward feed heating jaw.

8. The apparatus of claim 5 comprising:
   a plurality of deep drawing tools secured in a series to adjacent ones thereof and extending generally along one side of said outside heating jaw; and
   a plurality of said projections and congruent recesses equal in number to said plurality of deep drawing tools.

9. The apparatus of claim 1 further comprising means for heating said at least one outside suction plate disposed between said at least one outside suction plate and said outside carrier.

10. The apparatus of claim 9 further comprising means for insulating disposed between said outside carrier and said means for heating said at least one outside suction plate.

11. The apparatus of claim 1 wherein at least one of said main suction plates and said at least one outside suction plate comprises a continuous plate having a series of separate suction plates integrally defined therein and spaced in a direction generally perpendicular to said first and said second directions.

12. The apparatus of claim 1 wherein said deep drawing tool includes a cavity having a substantially triangular cross-section relative to a plane generally perpendicular to said second direction.

13. The apparatus of claim 1 wherein said forward feed heating jaw and said outside heating jaw are substantially rectangular in shape.

14. The apparatus of claim 1 wherein said lower outside suction plate is separated from said deep drawing tool by a space equal in distance to said defined interval.

15. The apparatus of claim 2 wherein:
   said at least three main suction plates include an upper main suction plate positioned in said second direction furthest from said lower main suction plate on said main carrier;
   said at least two outside suction plates include an upper outside suction plate positioned in said second direction furthest from said deep drawing tool; and
   said forward feed heating jaw is intermittently movable to intermittently position said upper main suction plate in said second direction beyond an end of said outside heating jaw.

16. The apparatus of claim 4 further comprising at least two deep drawing tools, at least one of said deep drawing tools generally disposed on each of said opposite sides of said main carrier of said forward feed heating jaw for movement parallel to said first direction.

* * * * *